United States Patent
Asghari Kamrani et al.

(10) Patent No.: US 12,518,224 B2
(45) Date of Patent: *Jan. 6, 2026

(54) MUSIC/VIDEO MESSAGING

(71) Applicant: Ameritech Solutions, Inc. (D51), Clifton, VA (US)

(72) Inventors: Nader Asghari Kamrani, Centreville, VA (US); Kamran Asghari Kamrani, Centreville, VA (US)

(73) Assignee: Ameritech Solutions, Inc., Clifton, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/249,768

(22) Filed: Jun. 25, 2025

(65) Prior Publication Data

US 2025/0322323 A1 Oct. 16, 2025

Related U.S. Application Data

(63) Continuation of application No. 18/656,433, filed on May 6, 2024, now Pat. No. 12,361,344, which is a continuation of application No. 18/125,829, filed on Mar. 24, 2023, now Pat. No. 12,003,552, which is a continuation of application No. 17/692,983, filed on Mar. 11, 2022, now Pat. No. 11,641,382, which is a continuation of application No. 17/379,805, filed on Jul. 19, 2021, now Pat. No. 11,310,093, and a continuation of application No. 16/560,833, filed on Sep. 4, 2019, now Pat. No. 11,190,388, which is a continuation of application No. 12/656,252, filed on Jan. 22, 2010, now abandoned, which is a continuation-in-part of application No. 12/453,847, filed on May 26, 2009, now abandoned.

(60) Provisional application No. 61/055,940, filed on May 23, 2008.

(51) Int. Cl.
G06Q 10/06 (2023.01)
G06F 3/0482 (2013.01)
G06Q 10/10 (2023.01)
G11B 27/034 (2006.01)

(52) U.S. Cl.
CPC ........... *G06Q 10/06* (2013.01); *G06F 3/0482* (2013.01); *G06Q 10/10* (2013.01); *G11B 27/034* (2013.01)

(58) Field of Classification Search
CPC ...... G06Q 10/06; G06Q 10/10; G06F 3/0482; G11B 27/034
See application file for complete search history.

(56) References Cited

U.S. PATENT DOCUMENTS

| | | | |
|---|---|---|---|
| 9,396,195 B1* | 7/2016 | Beguelin | H04N 21/4788 |
| 2008/0275966 A1* | 11/2008 | MacKinnon | H04L 67/563 |
| | | | 709/219 |
| 2009/0144392 A1* | 6/2009 | Wang | H04L 67/306 |
| | | | 709/217 |

* cited by examiner

*Primary Examiner* — Eric J. Bycer
(74) *Attorney, Agent, or Firm* — Invoke

(57) ABSTRACT

Device(s) and computer program products for creating custom music/video messages to facilitate and/or improve social interaction. The created music/video messages include at least portions of: music, video, pictures, slideshows, and/or text. The music/video messages enable feelings or emotions to be communicated by the user of the device to one or more recipient device(s).

20 Claims, 6 Drawing Sheets

MUSIC/VIDEO MESSAGING

CROSS-REFERENCES TO RELATED APPLICATIONS

This application is a continuation of U.S. application Ser. No. 18/656,433, filed May 6, 2024, now U.S. Pat. No. 12,361,344, which is a continuation of U.S. application Ser. No. 18/125,829, filed Mar. 24, 2023, now U.S. Pat. No. 12,003,552, which is a continuation of U.S. application Ser. No. 17/692,983, filed Mar. 11, 2022, now U.S. Pat. No. 11,641,382, which is a continuation of U.S. application Ser. No. 17/379,805, filed Jul. 19, 2021, now U.S. Pat. No. 11,310,093, which is a continuation of U.S. application Ser. No. 16/560,833, filed Sep. 4, 2019, now U.S. Pat. No. 11,190,388, which is a continuation of U.S. application Ser. No. 12/656,252, filed Jan. 22, 2010, which is a continuation-in-part of U.S. application Ser. No. 12/453,847, filed May 26, 2009, which claims priority to U.S. Provisional Application No. 61/055,940, filed May 23, 2008, the contents of each of which are incorporated herein by reference in their entireties.

FIELD

The present disclosure relates generally to digital communication, and more particularly to creating and/or sending music/video messages.

BACKGROUND

Today as digital communication becomes more commonplace, debates remain as to whether such communication helps, or hinders, inter-personal relationships. On one hand, communication using written words such as email and instant messaging (IM) remove meaning, or context, (e.g., facial expressions, gestures, etc.) surrounding the individual(s) communicating. Text messaging, which is becoming a more popular form of social interaction, relies heavily on the use of abbreviated words and acronyms—abridging communications even more. As a result, it is more difficult to ascertain or interpret true feelings or emotions behind such messages. On the other hand, it is recognized that digital communication helps to reduce boundaries that exist in the physical world attributed to e.g., geographic distance, social "circles," and more.

Every music has a message to say something. The message is for instance about love, friendship, family, peace, compassion, and how people can stay together with tolerance. But currently, music is primarily used as a form of entertainment, through personal devices such as CD players, iPods®, laptops or digital players. However, it has not yet been fully appreciated that music and the message of music may also be used as a form of communication to trigger memories or to express feelings or emotions. Moreover, as the market of multimedia wireless devices, mobile phones and computers spreads and new wireless network technologies are being improved, it is now possible to improve relationships and social networks using music/video messaging (music and/or video as a way of communication).

The music industry has been losing sales and revenue for several years because people are downloading and sharing music/video files over the Internet for cost savings from CD purchase. A survey by Student Monitor in Spring 2006 found more than half of all college students download and share music illegally. The music industry needs to understand that music file sharing is a business model issue that needs to be corrected. Instead of trying to blame the new technologies, the music industry should be looking at innovative ways to look at the digital media, Internet, mobile phone and cellular network technologies as an opportunity to increase sales. The present invention addresses this opportunity by introducing music/video messaging devices, methods, and computer program products to uncover the unique messaging value of music that has not been noticed by music industry. The disclosed music/video messaging devices and products will encourage users to purchase music, etc. from providers by allowing users to express their feelings and/or emotions via music/video messages.

SUMMARY

The present disclosure is directed to music/video messaging devices, methods and computer program products for connecting people on a social scale through the use of personal communication devices such as: personal computers, laptops, pocket PCs, mobile phones (iPhones®, etc.), portable media players (iPods®, etc.); and communication networks such as the Internet, wireless/mobile/cellular networks, and more.

The disclosed devices, methods and computer program products address certain aforementioned limitations by allowing users to send custom music/video messages that can be created, edited, etc. to improve and/or facilitate social interaction. For example, a user or client can create and send a music/video message that in one sense uses music, video, voice, text, etc. as "metadata" for a unique, custom message. In this way, a user is able to utilize multimedia as a tool to electronically convey his true emotions and/or feelings, trigger memories of shared experiences, convey a message based on common interests, and more. In embodiments, recipient(s) may choose to download the message, edit the message, and/or forward the message to other friend(s) or recipient(s). Each time the message is edited, forwarded, etc., new user-related information may be added to the message.

The disclosed devices and computer program products also address certain aforementioned limitations by involving music/video providers in the communication process. Preferably, the music/video providers offer content for users to customize and/or send as a message to others. By offering such content, the music/video providers are presented with additional sources of revenue, and are encouraged to produce or obtain quality products.

According to one aspect, a computer containing instructions residing on a computer-readable storage medium is disclosed such that the instructions when executed, configure the computer to: receive user input indicating selected content representative of the user's feelings and/or emotions; obtain representation(s) of the selected content; combine the representation(s) of the selected content into a single music/video message that represents the user's feelings and/or emotions; receive recipient device information; and send the music/video message to be displayed and/or played on one or more recipient device(s). In one embodiment, the computer corresponds to at least one of a: personal computer, laptop, personal digital assistant, pocket PC, portable media player (iPod®, etc.), smartphone and/or mobile phone (iPhone®, etc.). In another embodiment, the computer corresponds to a web server, personal computer, laptop, mainframe, and/or several computers, servers, handheld devices or mobile phones connected via a network. Preferably, the selected content corresponds to at least portions of music, video, pictures, slideshows, voice, and/or text message. Additional information may include, but is not limited to: sender's name, phone number, e-mail address and/or IP address; date; time; as well as recipient(s) name, phone number, e-mail address and/or IP-address, etc. Creating the custom music/video message includes combining representation(s) of the music, video, pictures, slideshows, voice, and/or text message into a single music/video message. Representation(s) of selected content include, but are not limited to: URLs, links, tags, files, labels, pointers, frames, clips, images, soundbytes, and/or streaming media. In some cases, the music/video message is displayed and/or played in streaming format for immediate and real time playback on recipient device(s). Receiving the music/video message in streaming format allows recipient(s) to listen and/or watch the message, but not to download the music/video file. This may be important if the content is protected by copyright law that only allows streaming of the content and not the download of actual file of that content. In other cases, the music/video message is displayed and/or played after recipient device(s) download the file associated with the message. It is appreciated that the instructions residing on the computer readable medium may take the form of an API, plug-in, add-on, or the like.

According to another aspect, a computer program product residing on a computer-readable storage medium and containing a set of instructions executable on a user computer is disclosed. The instructions when executed, configure the user computer to: receive user input indicating selected content representative of the user's feelings and/or emotions; obtain representation(s) of the selected content; combine the representations of the selected content into a single music/video message that represents the user's feelings and/or emotions; receive recipient device information; and send the music/video message to be displayed and/or played on one or more recipient device(s). The user computer corresponds to a: personal computer, laptop, personal digital assistant (PDA), pocket PC, smartphone, mobile media player (iPod®, etc.), and/or mobile phone (iPhone®, etc.). Preferably, the selected content corresponds to at least portions of music, video, pictures, slideshows, voice, and/or text message. Representation(s) of selected content include URLs, links, tags, files, labels, pointers, frames, clips, images, soundbytes, and/or streaming media. In some cases, the music/video message is displayed and/or played in streaming format for immediate and real time playback on recipient device(s). Receiving the music/video message in streaming format allows recipient(s) to listen and/or watch the message, but not to download the music/video file. This may be important if the content is protected by copyright law that only allows streaming of the content and not the download of actual file of that content. In other cases, the music/video message is displayed and/or played after recipient device(s) download the file associated with the message. It is appreciated that the instructions residing on the computer readable medium may take the form of an API, plug-in, add-on, or the like.

According to yet another aspect, a computer program product residing on a computer-readable storage medium and containing a set of instructions executable on a centralized computer is disclosed. The instructions when executed, configure the centralized computer to: receive input from the user indicating selected content representative of the user's feelings and/or emotions; obtain representation(s) of the selected content; combine the representations of the selected content into a single music/video message that represents the user's feelings and/or emotions; receive recipient device information; send the music/video message to be displayed and/or played on one or more recipient device(s). The centralized computer corresponds to one or more: web server, personal computer, laptop, and/or mainframe (e.g., connected over a network). Preferably, the selected content corresponds to at least portions of music, video, pictures, slideshows, voice, and/or text message. Representation(s) of selected content include URLs, links, tags, files, labels, pointers, frames, clips, images, soundbytes, and/or streaming media. In some cases, the music/video message is displayed and/or played in streaming format for immediate and real time playback on recipient device(s). Receiving the music/video message in streaming format allows recipient(s) to listen and/or watch the message, but not to download the music/video file. This may be important if the content is protected by copyright law that only allows streaming of the content and not the download of actual file of that content. In other cases, the music/video message is displayed and/or played after recipient device(s) download the file associated with the message. It is appreciated that the instructions residing on the computer readable medium may take the form of an API, plug-in, add-on, or the like.

One advantage of the music/video messages system disclosed herein is that it helps to improve existing relationships as well as to create new social links. Music/video messaging brings happiness and fun to new as well as existing relationships. The receiver of music/video message will get more value out of the message than from text alone. For example, playing a music/video message will provide different experience to the receiver of the message than a text message alone. Also, playing music/video message can trigger memories and emotions e.g., of shared or past experiences. For example, playing a wedding song can trigger romantic or sentimental feelings, playing a clip or sound-bite of a favorite movie can trigger happy or inspirational emotions, etc. As a result, friends and families could use music/video messages to communicate their feelings and emotions in new and creative ways that is not possible to do without it.

The present disclosure offers a solution to problems associated with remotely communicating feelings or emotions based on text alone. In addition, unlike systems and methods currently in use, the disclosure allows a user to create a custom music/video message that more closely reflects their true feelings or emotions instead of being limited to "pre-canned" messages.

Another advantage that the present devices and computer program products can provide is tailored music/video messages. As a result, music/video messages tailored to specific situations, interests, etc. may be messaged between users. Such music/video messages effectively enable users to communicate their true feelings, ideas, etc. while enabling music/video message recipients to experience positive feelings and emotions.

The disclosed music/video messages further allow users to more accurately communicate their feelings and/or emotions in remote and/or mobile situations.

Additionally, the disclosed music/video messages enable users to create a fun and social environment.

Furthermore, the disclosed music/video messages help users to strengthen existing relationships.

The music/video messages created according to the present disclosure further enable users to create new social links.

The disclosed music/video messages also serve to motivate music artists to produce high quality products with positive messages.

Additional advantages that the present devices and computer program products can provide is engaging users' feelings and/or emotion to increase music sales and revenue for music providers.

A further advantage of the present invention is that it enables the music industry to take advantage of Internet and mobile phone network capabilities.

Another advantage is to introduce a new messaging technique by enabling people to send the message of music.

Further advantage is that that the present systems and methods can bring artists closer to their fans.

Another advantage is that the present invention provides a new marketing tool for artists.

One more advantage is that the present systems and methods can provide useful information for data mining to reduce cost and increase revenue for music industry participants.

DETAILED DESCRIPTION

Reference will now be made in detail to various exemplary embodiments of the invention, examples of which are illustrated in the accompanying drawings. The following detailed description describes certain embodiments of the invention, and should not be considered as limiting the invention to those embodiments.

As used herein, "a" means at least one or more, "music/ video provider" means any provider of music, videos, slideshows, images, and/or text and may include inter alia one or more commercial entities, carriers, and/or service providers. The music/video message comprises a combination of at least portions of: music, video, pictures, slideshows, voice, and/or text. In some embodiments, a user may provide their own music, video, pictures, slideshows and/or text/voice message to be included in the music/video message. In embodiments, users may choose music, video, pictures, slideshows, and/or text from available lists, charts, icons, displays, etc. from the user device and/or a website to send to recipient(s) as a music/video message.

Figure 1:
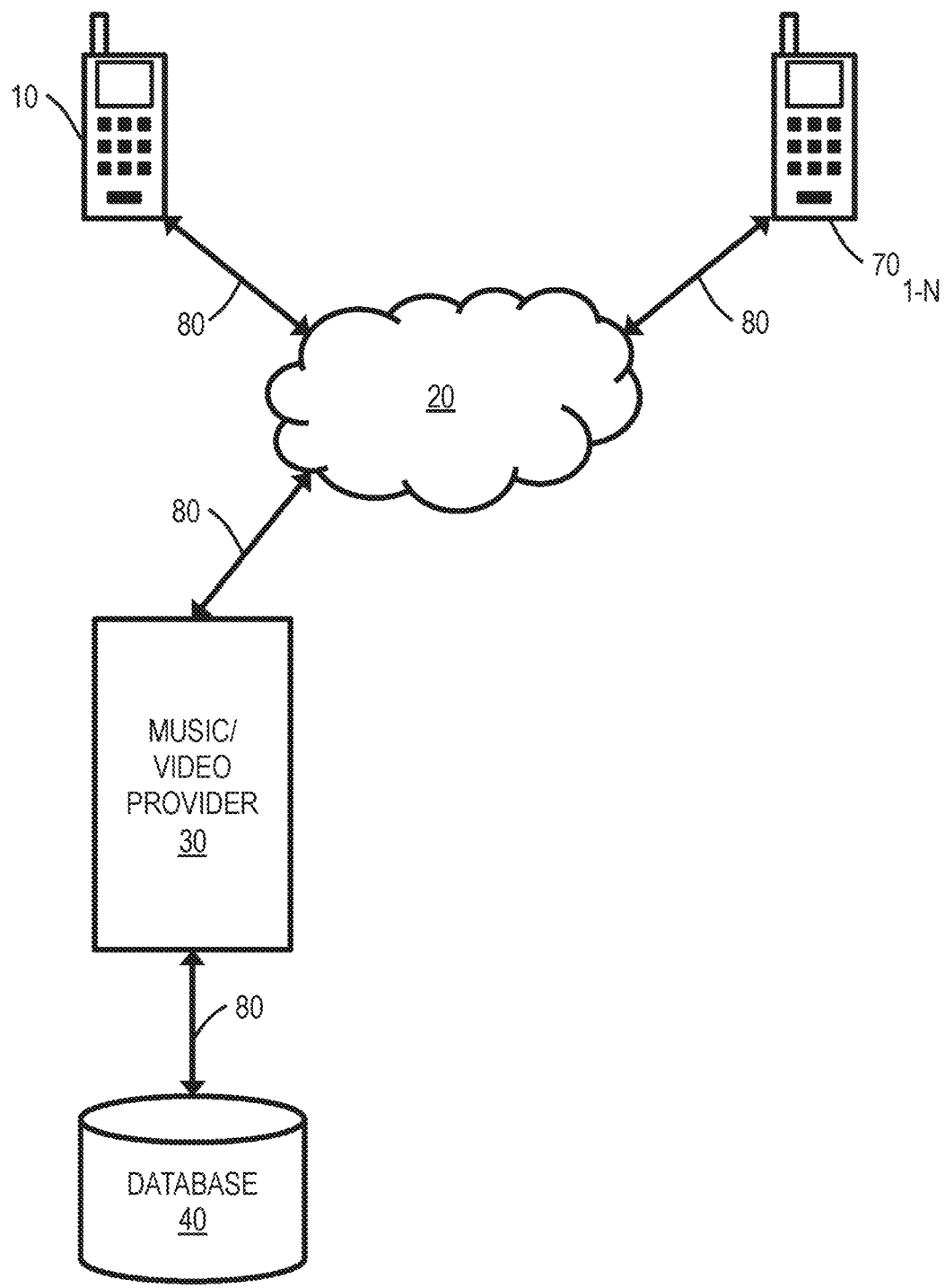
FIG. 1 is a block diagram illustrating a system for creating and/or sending music/video messages.

Turning now to the figures, which depict various exemplary embodiments of the invention, FIG. 1 shows a system for creating and sending music/video messages. As shown in the Figure, a user device 10 receives user input indicative of content selections that represent the user's feelings and/or emotions. Representations of the selected content may be obtained directly from storage associated with the user device 10, and/or storage associated with a music/video provider 30. The music/video provider 30, in turn, may provide representations of the content and/or consult one or more associated databases 40. Representations of selected content include, but are not limited to: URLs, links, tags, files, labels, pointers, frames, clips, images, soundbytes, and/or streaming media. The representations of the selected content are combined by either the user device 10 and/or music/video provider 30 to create a custom music/video message. The created music/video message is sent over communication network 20 and communication links 80 to be played and/or displayed on one or more recipient device(s) 70(1-$n$). It will be appreciated that communication network 20 includes any combination of: LANs, WANs, MANs, the Internet, Intranets, private networks, wired and/ or wireless (e.g., IEEE 802.11 standard, satellite, cellular, GSM/GPRS, 3G, 4G, EDGE, CDMA, TDMA) networks, mobile networks, public switched telephone networks (PSTN), SMS, SMSC, MMS, SMTP/MIME and/or IM distribution networks, aggregators, provisioning and hosting providers, mobile operators, streaming delivery providers, service providers, gateways, etc. Communication links 80 include transmission links such as wired, wireless, fiber-optic, mobile and the like.

Figure 2A:
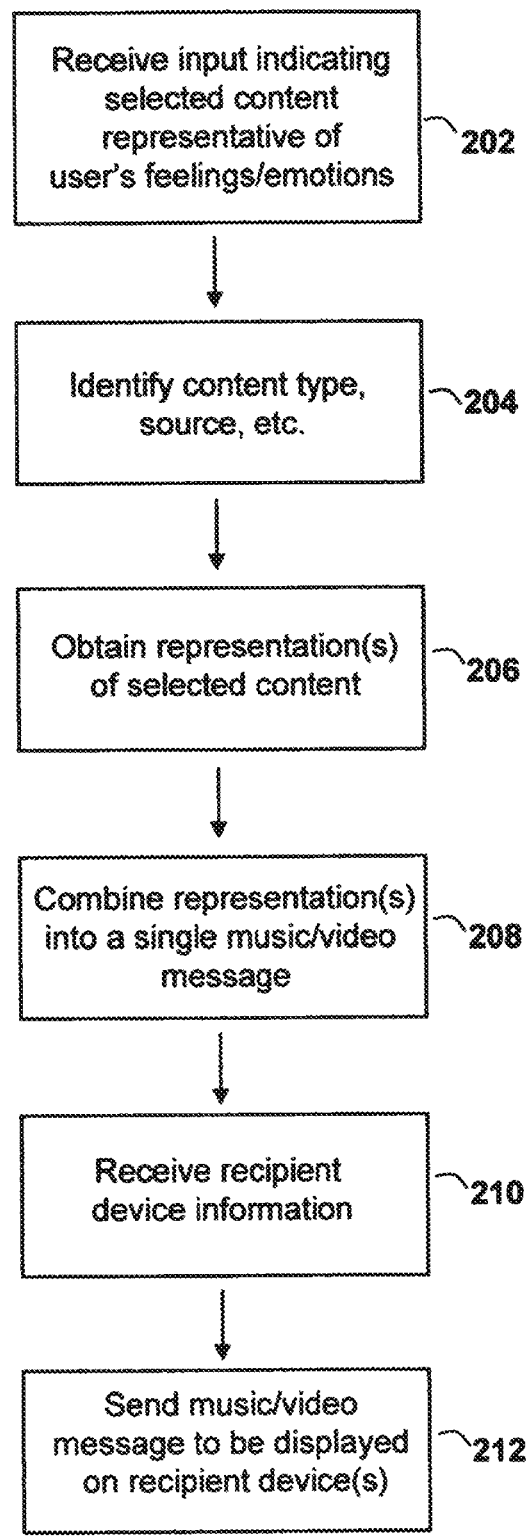
FIGS. 2a and 2b illustrate flowcharts for creating and sending music/video messages according to exemplary embodiments.

According to one aspect, the user device 10 is configured to create and send music/video messages representative of the user's feelings and/or emotions. FIG. 2a shows a flowchart illustrating method steps performed by user device 10. As shown in step 202, user device 10 receives input indicating selected content representative of the user's feelings or emotions. The content may be identified by type (e.g., image, audio, video, text), source (e.g., storage location), etc. See step 204. In 206, user device 10 obtains representation(s) of the selected content. Such representations include, but are not limited to: URLs, links, tags, files, labels, pointers, frames, clips, images, soundbytes, and/or streaming media. The content is combined in step 208 to create a custom music/video message. Recipient device information is received in step 210 and the music/video message is sent to one or more recipient device(s) (step 212). It is appreciated that the user device 10 and/or music/video provider 30 sends the music/video message using any combination of HTTP, FTP, SMTP, RTP, WAP, SMS, MMS, IM protocols, or the like.

Figure 2B:
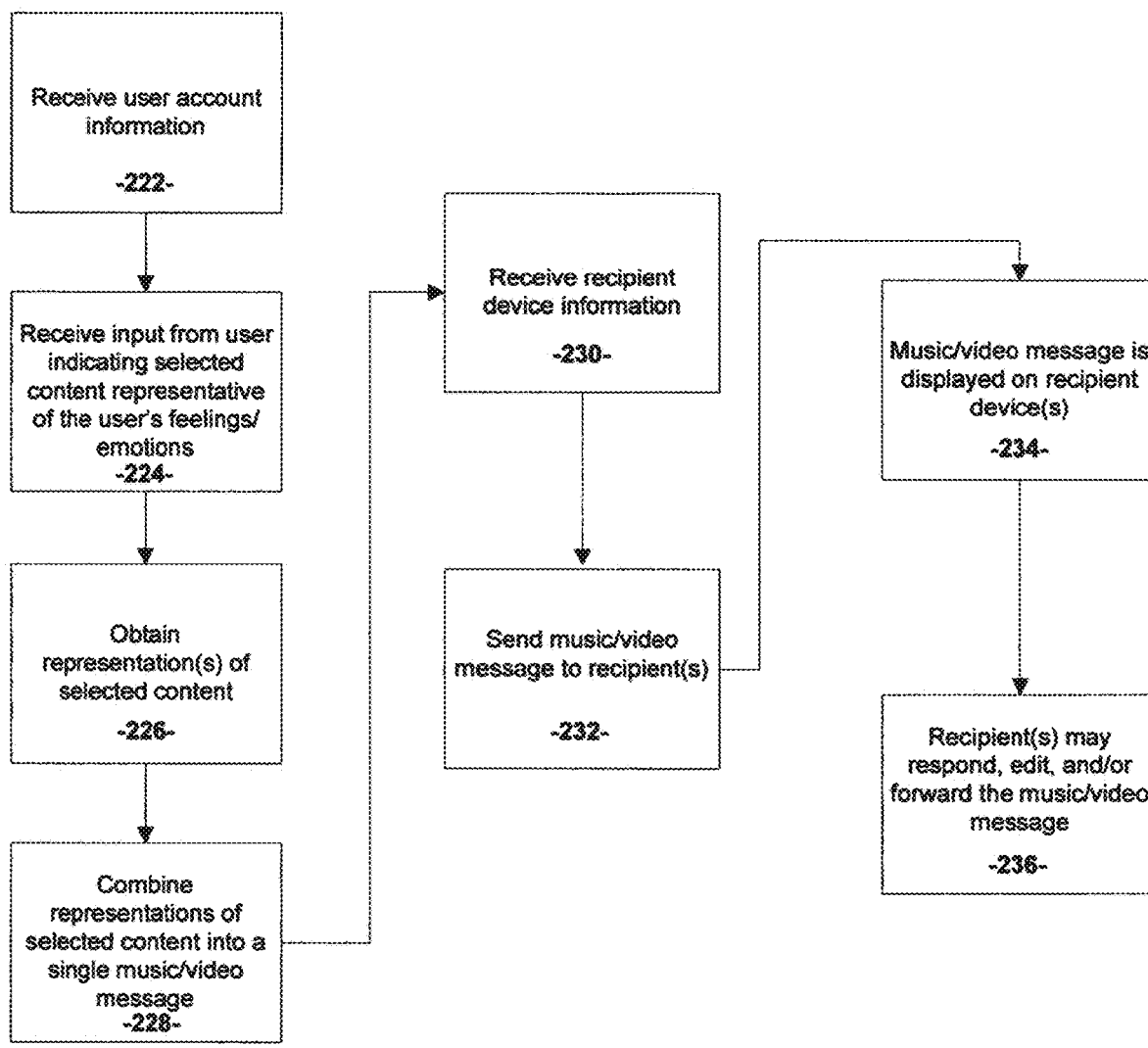

According to another aspect, the music/video provider 30 is configured to create and send music/video messages representative of the user's feelings and/or emotions. FIG. 2b shows a flowchart illustrating method steps performed by music/video provider 30. It is appreciated that the music/ video provider 30 may comprise at least one of a: server (e.g., a web server), a PC, a laptop, mainframe, or the like, connected over a communication network. The user device 10 communicates with the music/video provider 30 (e.g., by accessing the music/video providers' 30 website). In embodiments, the music/video provider may provide music messaging service to the user without requiring the user to login. In other embodiments, the website may use any authentication method such as user name and password to authenticate the user. In some embodiments, the website may include: login, search, accounting, reporting, feedback options and more. In step 222, the music/video provider 30 receives user account information from user device 10, and upon successful authentication, receives input from the user device 10 indicating selected content representative of the user's feelings and/or emotions (step 224). According to step 226, the music/video provider 30 obtains representation(s) of selected content. The content (or content representations) are combined in step 228 into a single music/video message. In 230, the music/video provider 30 receives recipient device 70(1-$n$) information from user device 10. The music/ video message is then sent to be displayed and/or played on the recipient device(s) 70(1-$n$) (steps 232, 234). The recipient devices 70(1-$n$) in turn, may respond, edit, and/or forward the music video message. See step 236. In embodiments, the recipient device may receive the music/video message in streaming format. Receiving the music/video message in streaming format may only allow the recipient to listen/watch the message and not allow recipient to download the music/video file. This may be important if the content is protected by copyright law that only allows streaming of the content and not the download of actual file of that content.

It is understood that the method steps of the present disclosure may be performed using any combination of hardware and/or software as will be appreciated by those skilled in the art. Preferably, instructions residing on computer readable media configure the user computer and/or central computer to execute the method steps. Such instructions may be in the form of an API, plug-in, add-on, download, or the like and may also contain additional hardware and/or software instructions for performing the disclosed method steps and/or storing music/video content. Software instructions may further include custom macros, sub-routines, logic, or the like implemented using commercially available software such as MS SQL Server™, VISUAL BASIC®, C, C++, SMIL, XML, HTML, XHTML, JAVA®, JAVASCRIPT®, C #, APIs, etc. According to a further embodiment, the software instructions for performing the disclosed method steps reside in whole, or in part, on a computer-readable medium. In embodiments, the computer readable medium corresponds to portions of storage media (14, 34) on user device 10 and/or music/video provider 30. Examples of computer readable media include, but are not limited to: hard drives, memory chips (e.g., RAM/ROM), memory sticks (e.g., USB), memory cards (e.g., SD, SIM, etc.), CDs, DVDs, tapes, or the like. In addition, the computer readable media may be integral with, or removable from, user device 10 and/or music/video provider 30.

In embodiments, selected content (or representations of content) may be combined using a variety of open source, commercial, or custom "mixing" software, instructions, and/or protocols (such as SMIL players, FFmpeg, etc.). In addition, content (or representations of content) may be mixed using one or more approach. For example, the selected content (e.g., music, video, pictures, and/or text) may be combined in a single container (such as a 3GP container, etc.). In another example, the selected content (e.g., music, video, pictures, and/or text) is combined by referencing and/or embedding the content in the music/video message. In another example, the selected content is combined using protocols such as Multimedia Messaging Service (MMS), Web Service Initiation Protocol (WIP), MIME, etc. (the RFC's of which are incorporated herein by reference). In yet another example, the contents are combined by putting them on different layers using any video overlay technique that will look like single content to the recipient. In some cases, the combined content may further include advertising materials. Selected content may include, but is not limited to, the following formats: MP3, WAV, WMA, AppleLossless™, FLAC™, RealAudio™, Ogg™, Vorbis™, Sorenson™, AIFF, AAC, MIDI, MPEG, JPEG, MIDI, 3GPP, AVI, BMP, GIF, TIFF, PNG, MOV, Real Video™, MJPEG, TXT, etc.

Figure 3A:
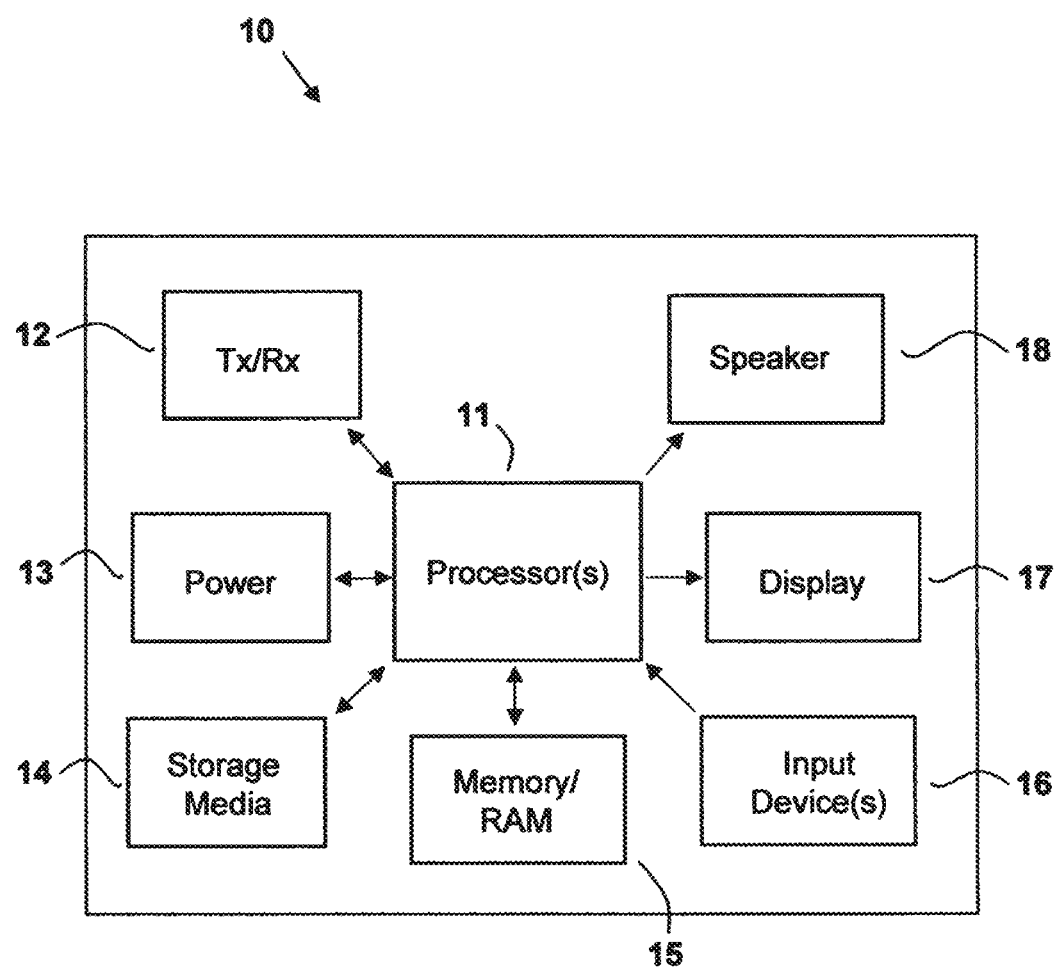
FIG. 3a is a block diagram depicting a user computer according to an exemplary embodiment.

FIG. 3a shows a block diagram of user device 10. The user device 10 is any communication device that includes, but is not limited to: a personal computer, laptop, personal digital assistant, pocket PC, smartphone, portable media player (iPod®, etc.) and/or mobile phone (iPhone®, etc.). Preferably, the user device 10 comprises: one or more processors 11, one or more transmitters and receivers 12 (including antennae), a power supply 13 (e.g., connected to a motherboard), storage media 14, memory/RAM 15, input device(s) 16, a display 17, and a speaker 18. It is appreciated that the one or more processors 11 include a CPU, video processor, audio processor, etc. Examples of storage media 14 include: ROM, hard drives, SD cards, micro SD cards, multimedia cards, SIM cards, compact flash, secure digital, memory sticks, CDs, DVDs, floppy disks, ZIP drives, tapes, and the like. Input devices 16 may include: keyboards, voice input, touch screen, stylus, mouse, etc. User device 10 may also include data interface(s), such as IR, USB, FIREWIRE, BLUETOOTH, etc. (not shown). The user device 10 also includes a proprietary or open source Operating System including, but not limited to any Windows™ UNIX/Linux™, or MAC™ platform (e.g., iPhone® 3G or later), RIM™ OS, PALM™ OS, Symbian™ OS, etc. In addition, the user device 10 includes a graphical user interface and preferably web browsing capabilities such as Mobile Explorer™, Opera™, Safari™, or the like. The user device 10 may also include a media player residing on storage media 14. Examples of suitable media players include, but are not limited to: SMIL players such as Adobe™ Media Player, QuickTime™ Player, RealPlayer™, Helix™ Player, Totem™ Player, Flash™, etc. or other equivalent proprietary or open source software. In some cases, instructions/updates for creating and sending the music/video message may also be downloaded from the music/video provider 30.

Figure 3B:
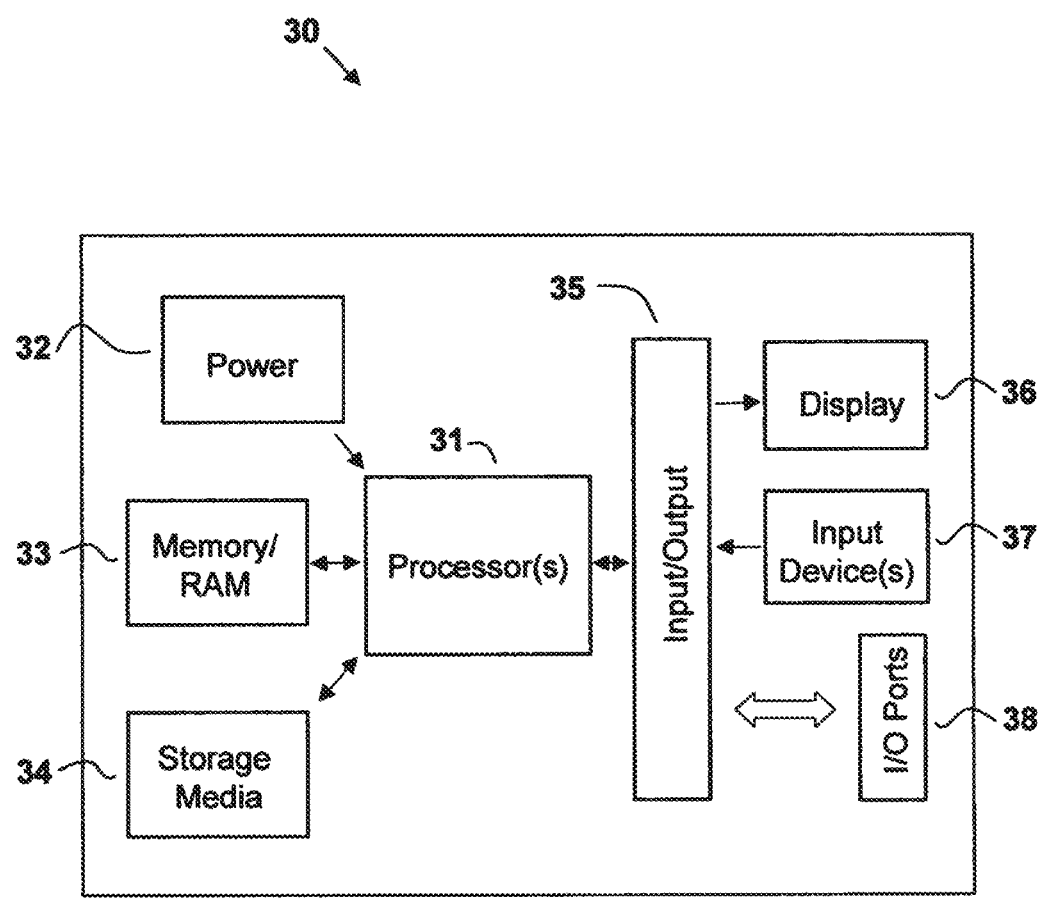
FIG. 3b is a block diagram depicting a centralized computer according to another exemplary embodiment.

FIG. 3b shows a block diagram of music/video provider 30. The music/video provider 30 includes, but is not limited to: one or more server (e.g., web servers), computers, laptops, mainframes, or the like connected over a communication network. Preferably, the music/video provider 30 comprises: one or more processors 31 (CPU, video processor, audio processor, etc.), a power supply 32 (e.g., connected to a motherboard), memory/RAM 33, storage media 34, an input/output controller 35, a display 36, input device(s) 37, and I/O communication ports 38. It is appreciated that the one or more processors 31 include a CPU, video processor, audio processor, etc. Examples of storage media 34 include: ROM, hard drives, CDROMs, DVDs, memory sticks, memory cards, floppy disks, Zip™ drives, tapes, and the like. Input devices 37 may include: keyboards, voice input, touch screen, stylus, mouse, etc. The music/video provider 30 also includes a proprietary or open source Operating System including, but not limited to any Windows™, UNIX™/Linux™, or MAC™ platform. Preferably, the music/video provider 30 includes web server software including, but not limited to: APACHE, IIS, UBUNTU, etc. The music/video provider 30 also preferably includes a media player residing on storage media 34. Examples of suitable media players include, but are not limited to, SMIL players such as Adobe™ Media Player, QuickTime™ Player, RealPlayer™, HelixT™ Player, Totem™ Player, Flash™, etc.

According to an exemplary embodiment, the user device 10 registers with the music/video provider 30 website before creating/sending music/video messages. For example, a user account may include: name, address, phone number, email, and/or credit card information. If necessary, the user device 10 downloads any instructions necessary to configure the user device 10 to create music/video messages. Preferably, the music/video provider 30 displays available content to the user on a website via a series of lists, charts, icons, displays, etc. According to various design considerations, such content may be grouped by title, artist, theme, subject, keywords, or the like. In addition, a user may search content via the music/video provider 30 website by entering search terms, keywords, etc. In addition, search capabilities may allow a user to speak the search terms, selections, etc. using voice recognition software. Once content has been selected, the user provides recipient information for delivering a music/video message. Such recipient information includes at least one of: email address, phone number, music/video provider site account information (where the recipient has an account with the same or different music/video provider, or other service providers such as Facebook™, MySpace™, YouTube™, AIM™, Plaxo™, Twitter™, or the like), account information, etc. In some cases, the music/video provider 30 is configured to provide "Send" Options to enable user to schedule music/video messages to be sent at specific times and dates (e.g. birthday, anniversary, etc.).

The music/video provider 30 combines the selected content using a variety of open, commercial, or custom "mixing" software, instructions and/or protocols (such as SMIL players, FFmpeg, etc.); by combining the content in a single container (such as a 3GP container, etc.); by referencing and/or embedding the content in the music/video message; using available protocols such as MMS, WIP, MIME, etc., and/or any other suitable technique as will be appreciated by those skilled in the art. In one exemplary embodiment, the music/video provider 30 is configured to embed the selected content in a file along with other information regarding the music/video message. For example, the music/video provider 30 may be configured to combine content by embedding the information IN TABLE I in a single file associated with a music/video message:

TABLE II

<img src="img.bmp" region=/>
<audio src="sound.mp3"/>
<text src="message.txt." region=/>

In some embodiments, information regarding the music/video message (e.g., sender information, message ID, time/date, recipient information, etc.) is stored in one or more database(s) 40 maintained by the music/video provider 30. As shown in FIG. 1, the music/video message is sent via communication network 20. It is understood that the communication network 20 may include one or more distribution chain players including, but not limited to: aggregators, gateways, provisioning and hosting providers, mobile operators, SMS centers, streaming delivery providers and/or other service providers, etc. as will be appreciated by those skilled in the art. The distribution chain players are then responsible for notifying one or more of the recipient device(s) 70(1-n) of the music/video message, adapting, and/or delivering the message.

It is further appreciated that the music/video provider 30 may be a single provider or alternatively may correspond to multiple providers. For example, the music/video provider 30 may include one provider that interfaces with users and has business relationships with, and is in communication with, other music/video providers 30. In addition, one or more music/video provider 30 may offer a various types of content such as: music and video; music, video and pictures, etc. According to various business models, the music/video provider(s) 30 may provide content to the user and/or recipient(s) for free (e.g., with added advertising), or for a fee.

It is appreciated that music/video provider 30 may allow the user to provide the content rather than using service provider's content. In this case, the service provider creates the music/video message using content provided (e.g., uploaded) by the user and sends it to the recipient.

It is also appreciated that the contents and/or instructions for creating/sending music/video messages may reside completely on the user device 10, and that a music/video provider 30 is not necessary. In this case, created messages may be stored on storage media 14 accessible by the user device 10 (e.g., SD card, memory card, etc.). The user then may select the music/video content to be communicated to a recipient that represents his/her feeling(s) and/or emotions via a user interface of the user device 10. Here, the user device 10 is configured to combine the selected content (e.g., music, video, pictures, slideshows, voice, and/or text) and send a custom music/video message without contacting a music/video provider 30. For example, the user device 10 is configured to combine the selected content by: using a variety of open, commercial, or custom "mixing" software, instructions and/or protocols (such as SMIL players, FFmpeg, etc.); placing the content in a single container (such as a 3GP container, etc.); by referencing and/or embedding the content in the music/video message and/or using available protocols such as MMS, WIP, etc. In one exemplary embodiment, the user device 10 is configured to embed the selected content in a file along with other information regarding the music/video message. For example, the user device 10 may be configured to combine content by embedding the information in Table 2 in a single file associated with a music/video message:

TABLE II

<img src="img.bmp" region=/>
<audio src="sound.mp3"/>
<text src="message.txt." region=/>

The music/video message is then sent to communication network 20. It is understood that the communication network 20 includes one or more distribution chain players including, but not limited to: aggregators, gateways, provisioning and hosting providers, mobile operators, SMS centers, streaming delivery providers and/or other service providers, etc. as will be appreciated by those skilled in the art. These distribution chain players are then responsible for notifying one or more of the recipient device(s) 70(1-n) of the music/video message, adapting, and/or delivering the message. For example, the distribution chain players inform the recipient device(s) 70(1-n) that the music/video message is available. This may be done, for example, by sending an email or text message to the recipient device(s) 70(1-n) including instructions for accessing the music/video message. In some cases, the instructions include, e.g., a URL link and/or code for accessing/streaming/downloading the message and its contents. Preferably, the recipient device(s) 70(1-n) include, but are not limited to: mobile phones (iPhones®, etc.), smartphones, portable media players (iPods®, etc.), laptops, PCs, pocket PCs, and PDAs. In other cases, the recipient device(s) 70(1-n) are able to view the music/video message directly without having to first download the contents or click on a link. In some cases, the recipient device(s) 70(1-n) may receive the music/video message in streaming format. Receiving the music/video message in streaming format may allow the recipient to only listen and/or watch the message and not allow recipient to download the music/video file. This may be important if the content is protected by copyright law that only allows streaming of the content and not the download of actual file of that content.

Figure 4:
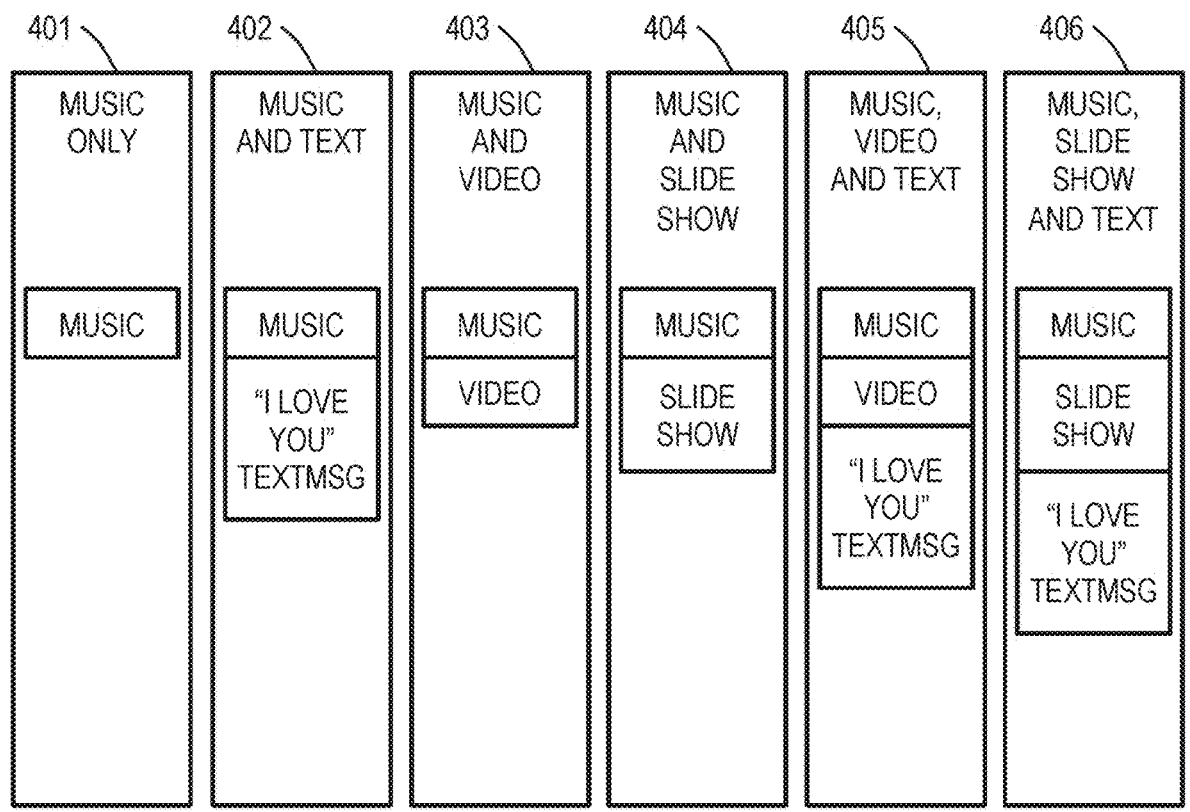
FIG. 4 depicts various combinations of music video/ messages.

FIG. 4 depicts different types of content combined in a music/video message (401-406). As shown, various combinations may include, but are not limited to: music only; music and text/voice; music and video; music and slide show; music, video and text/voice; music, slide show and text/voice, etc.

According to another non-limiting example, members of social networking sites (such as Facebook™, MySpace™, YouTube™, AIM™, Plaxo™, Twitter™, or the like) may send music/video messages to their network of friends. When a social networking user receives a music/video message from another member, the user may keep the message, or part of the message, private or public. The user may allow others to see information such as number of music/video messages that the user has or who the sender is. The user may also allow other members to listen and/or watch the user's music/video messages.

Example 1: a user wants to include Madonna's "Crazy for You" music/video into a music/video message and send it to a recipient phone number which is in our example 703-470-3040. The user brings up a mobile phone's text messaging screen and enters the text message "7034703040 Madonna (Crazy for You)". This text message is sent to the music/video provider's short code (which, in this example is 123456). As soon as music/video service provider 30 receives the text message, the music/video provider 30 creates the music/video message and sends it to the recipient contact information which, in this example, is recipient's phone number 703-470-3040.

Example 2: a user wants to include Madonna's "crazy for you" music/video into a music/video message that also contains text such as "I AM REALLY CRAZY" and send it to a recipient phone number 703-470-3040. The user brings up a mobile phone's text messaging screen and enters the message "7034703040 Madonna (Crazy for You) (I AM REALLY CRAZY)". This text message is sent to music/video provider's short code (which, in this example is 123456). As soon as music/video service provider 30 receives the text message, the music/video provider 30 creates the music/video message and sends it to the recipient contact information which, in this example, is recipient's phone number 703-470-3040.

Example 3: a user's mobile phone number is 310-230-9000 and the user wants to send Madonna's "crazy for you" music/video into a music/video message and send it to a recipient phone number 703-470-3040. The user creates an email and enters the text message "310-230-9000 7034703040 Madonna (Crazy for You)". The user sends this email message to music/video provider's email address. As soon as music/video service provider 30 receives this email message, the music/video provider 30 creates the music/video message and sends it to the recipient contact information which, in this example, is recipient's phone number 703-470-3040. The music/video provider 30 may also to choose to call the user's mobile phone number or send an SMS text message and ask for confirmation before sending the music/video message to the recipient.

Example 4: a user wants to include Madonna's "Crazy for You" music/video into a music/video message and send it to a recipient phone number 703-470-3040. The user dials the music/video provider's phone number and leaves a voice message "7034703040 Madonna (Crazy for You)". As soon as music/video service provider 30 receives this voice message, the music/video provider 30 creates the music/video message and sends it to the recipient contact information which, in this example, is recipient's phone number 703-470-3040. The music/video provider 30 may also to choose to call the user's mobile phone number or send an SMS text message and ask for confirmation before sending the music/video message to the recipient.

Example 5: a music artist wants to promote her new album. The artist logs in to her account at a music/video provider 30, uploads her new song (if the music/video provider does not have that song) and also provides mobile phone number of her fans as contact information (if the music/video provider does not have them). She may also provide a text message such as "Dear friend, enjoy my new song" and request the music/video provider 30 to send it. As soon as music/video provider 30 receives the artist's request, the music/video provider 30 creates the music/video message and sends an SMS message that contains a link to the music message to the recipients' mobile phone 70(1-$n$). Recipient(s) are then able to click on the link, and the mobile phone 70(1-$n$) will show the music/video message in streaming format.

The foregoing discussion of the preferred embodiments has been presented for purposes of illustration and description. It is not intended to be exhaustive or to limit the disclosure to the above examples. Many variations and modifications of the embodiments described herein will be apparent to one of ordinary skill in the art in light of the present disclosure. Accordingly, the scope of the disclosure is to be defined only by the claims appended hereto, and by their equivalents.

We claim:

1. A system for enhancing electronic messaging of multimedia content via a communication network, the system comprising:
    a processor;
    a computer-readable storage device; and
    program instructions stored on the computer-readable storage device that, when executed by the processor, control the system to perform operations comprising:
        electronically communicating, by a content provider via a communication network, a representation of the multimedia content to a computing system of a social media site for delivery to a recipient, wherein:
            the content provider stores the multimedia content, and
            the representation comprises information for rendering the multimedia content; and
        electronically delivering, by the content provider, the multimedia content to a device of the recipient using the information for rendering the multimedia content.

2. The system of claim 1, wherein the multimedia content comprises: music content, audio content, video content, image content, audiovisual content, or text content, or any combination of the music content, the audio content, the video content, the image content, the audiovisual content, and the text content.

3. The system of claim 1, wherein rendering the multimedia content comprises at least one of: playing or displaying the multimedia content at the device of the recipient using the information.

4. The system of claim 1, wherein the multimedia content further includes a content item provided via the device of a user.

5. The system of claim 1, wherein a device of a user downloads instructions used to create and send the multimedia content to the recipient via the social media site.

6. The system of claim 1, wherein the multimedia content comprises a combination of at least one multimedia content item with a second content item.

7. The system of claim 6, wherein the second content item comprises one or more of: text content entered by a user, video content, image content, audiovisual content, music content, and audio content.

8. The system of claim 6, wherein the at least one multimedia content item is provided by the content provider.

9. The system of claim 6, wherein the system is part of the computing system of the social media site.

10. The system of claim 1, wherein the information comprises a uniform resource locator (URL), a link, a tag, a frame, an image, a streaming media, a label or a pointer to the multimedia content stored at the content provider.

11. The system of claim 1, wherein electronically delivering the multimedia content comprises presenting the multimedia content at the device of the recipient via the communication network.

12. A system of a social media site to enhance electronic messaging, the system comprising:
 a processor;
 a computer-readable storage device; and program instructions stored on the computer-readable storage device that, when executed by the processor, control the system to perform operations comprising:
  electronically receiving, from a content provider, a representation of multimedia content for delivery to a recipient via the social media site based on a delivery request,
  wherein:
   the delivery request is provided by a user via a user device,
   the content provider stores the multimedia content, and
   the representation of the multimedia content comprises information for rendering the multimedia content, and
  electronically delivering, via a communication network, using the information for rendering the multimedia content to a device of the recipient.

13. The system of claim 12, wherein the system is part of a computing system of the content provider.

14. The system of claim 12, wherein the multimedia content comprises: music content, audio content, video content, image content, audiovisual content, or text content, or any combination of the music content, the audio content, the video content, the image content, the audiovisual content, and the text content.

15. The system of claim 12, wherein the multimedia content stored at the content provider is accessed and/or downloaded by the device of the recipient using the information for rendering the multimedia content.

16. The system of claim 12, wherein the information for rendering the multimedia content comprises a uniform resource locator (URL), a link, a tag, a frame, an image, a streaming media, a label or a pointer to the multimedia content stored at the content provider.

17. The system of claim 12, wherein rendering the multimedia content comprises presenting the multimedia content at the device of the recipient via the communication network.

18. A system of a social media site to enhance electronic multimedia messaging, the system comprising:
 a processor;
 a computer-readable storage device; and
 program instructions stored on the computer-readable storage device that, when executed by the processor, control the system to perform operations comprising:
  electronically receiving, from a content provider, a multimedia message, wherein the multimedia message comprises a representation of multimedia content; and
  electronically delivering the multimedia message to a recipient based on a delivery request, wherein:
   the content provider stores the multimedia content,
   the delivery request is provided by a user via a user device,
   the delivery request indicates delivery of the multimedia message to the social media site, and
   the representation of the multimedia content comprises information for rendering the multimedia content to a device of the recipient.

19. The system of claim 18, wherein the information for rendering the multimedia content comprises a uniform resource locator (URL), a link, a tag, a frame, an image, a streaming media, a label or a pointer to the multimedia content stored at the content provider.

20. The system of claim 18, wherein the system is part of a computing system of the content provider.

* * * * *